Figure 1:
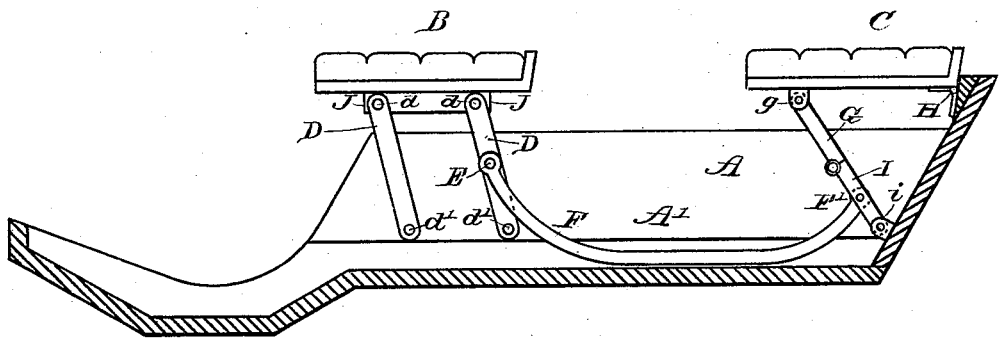

(No Model.)

F. A. SANDS.
JUMP SEAT VEHICLE.

No. 309,805. Patented Dec. 23, 1884.

Witnesses
John C. Miller
Percy G. Bowen

Francis A. Sands
Inventor
W. T. Fitzgerald
Attorney.

UNITED STATES PATENT OFFICE.

FRANCIS A. SANDS, OF SALISBURY, ASSIGNOR OF ONE-HALF TO F. A. BABCOCK, OF AMESBURY, MASSACHUSETTS.

JUMP-SEAT VEHICLE.

SPECIFICATION forming part of Letters Patent No. 309,805, dated December 23, 1884.

Application filed March 7, 1884. (No model.)

*To all whom it may concern:*

Be it known that I, FRANCIS A. SANDS, a citizen of the United States, residing at Salisbury, in the county of Essex and State of Massachusetts, have invented a new and useful Improvement in Jump-Seat Carriages, of which the following is a specification.

The object of the improvement is a simple and reliable means for connecting, quickly and easily adjusting, and bracing the seats of a carriage in position. These results are attained by the mechanism illustrated in the drawings herewith filed as part hereof, in which the same letters of reference denote the same parts in the different views.

Figure 2:
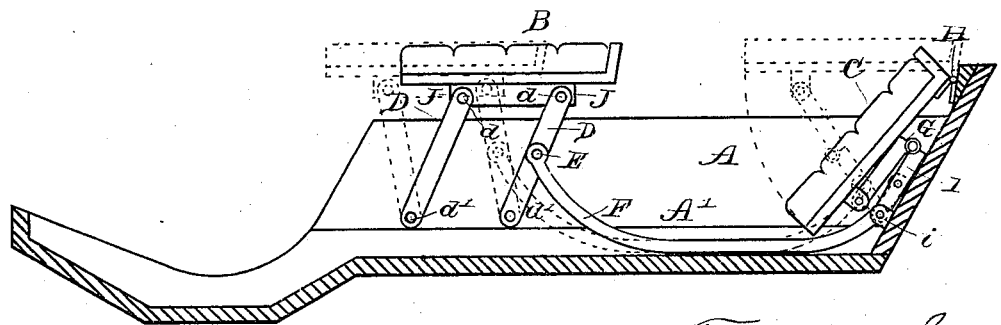

Figure 1 is a side elevation, partly in section, of a carriage embodying the features of my improvement. Fig. 2 is a similar view, showing the parts in a different position.

A is the carriage-body, of which A' is the sill.

B is the front seat.

C is the rear seat.

D D represent front-seat supports on each side of the body, flexibly connected to the seat, as shown at $d$, and to the body or sill, substantially as shown at $d'$.

G and I represent jointed braces or toggles, flexibly secured to the rear seat as shown at $g$, and to the body A, as shown at $i$.

F represents a curved bar or connecting-rod at each side of the body, flexibly secured to the front seat-supports, D D, as shown at E, and to the rear-seat supports G I, as shown at F'.

H H represent hinges connecting the rear seat, C, to the carriage-body. By raising the rear seat, C, the parts may be readily adjusted to the position shown in Fig. 1, where they will be braced by the curved bars F and the toggle I. By moving the front seat, B, rearward the parts may be readily set in position shown in Fig. 2, where the curved bars F will bear against the rear end of the body A, and rigidly brace the changed position of the front seat, B.

I am aware that prior to my invention jump-seats have been invented with rods for connecting and working both seats together, and I therefore do not claim such a combination, broadly; but

What I claim, and desire to secure by Letters Patent, is—

The combination of the front seat, B, flexibly-connected supports D D, the curved rods E F, toggles or jointed braces G I, and the rear seat, C, all constructed and arranged to operate as specified, for the purpose set forth.

FRANCIS A. SANDS.

Witnesses:
JAMES DUNLAP,
HENRY B. PACKARD.